May 29, 1934.　　　R. B. LONG　　　1,960,948
REGISTER
Filed July 1, 1929　　　7 Sheets-Sheet 1

INVENTOR.
Robert B. Long
BY H. W. Baker
ATTORNEYS.

May 29, 1934. R. B. LONG 1,960,948
REGISTER
Filed July 1, 1929 7 Sheets-Sheet 3

INVENTOR.
Robert B. Long
BY H. W. Baker
ATTORNEYS.

May 29, 1934.   R. B. LONG   1,960,948
REGISTER
Filed July 1, 1929   7 Sheets-Sheet 4
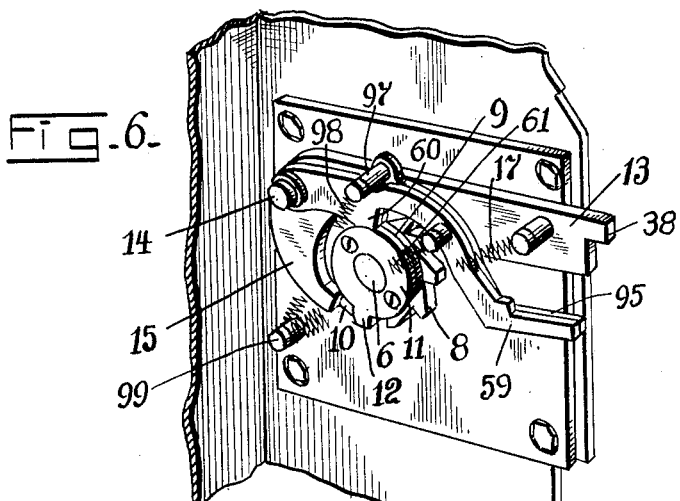
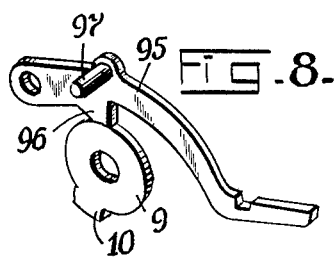
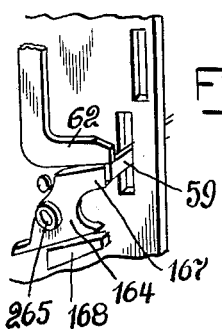
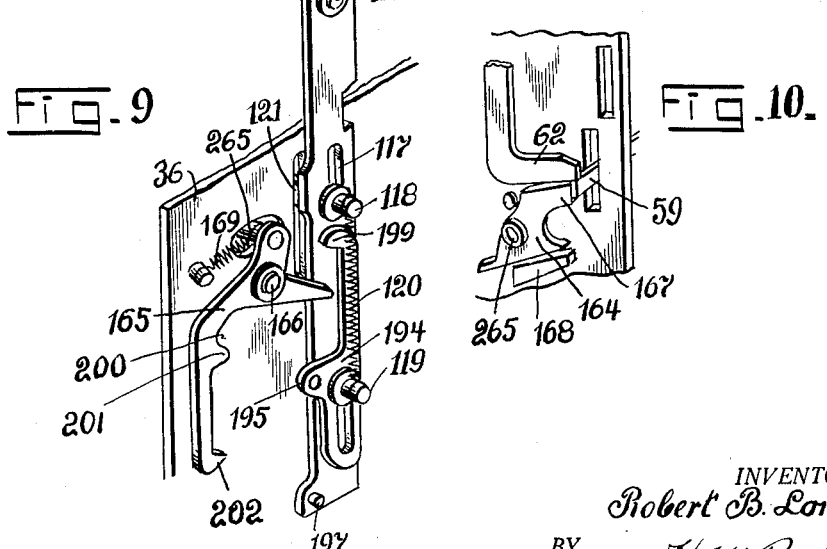
INVENTOR.
Robert B. Long
BY
H W Baker
ATTORNEYS.

May 29, 1934.  R. B. LONG  1,960,948
REGISTER
Filed July 1, 1929　　　7 Sheets-Sheet 5
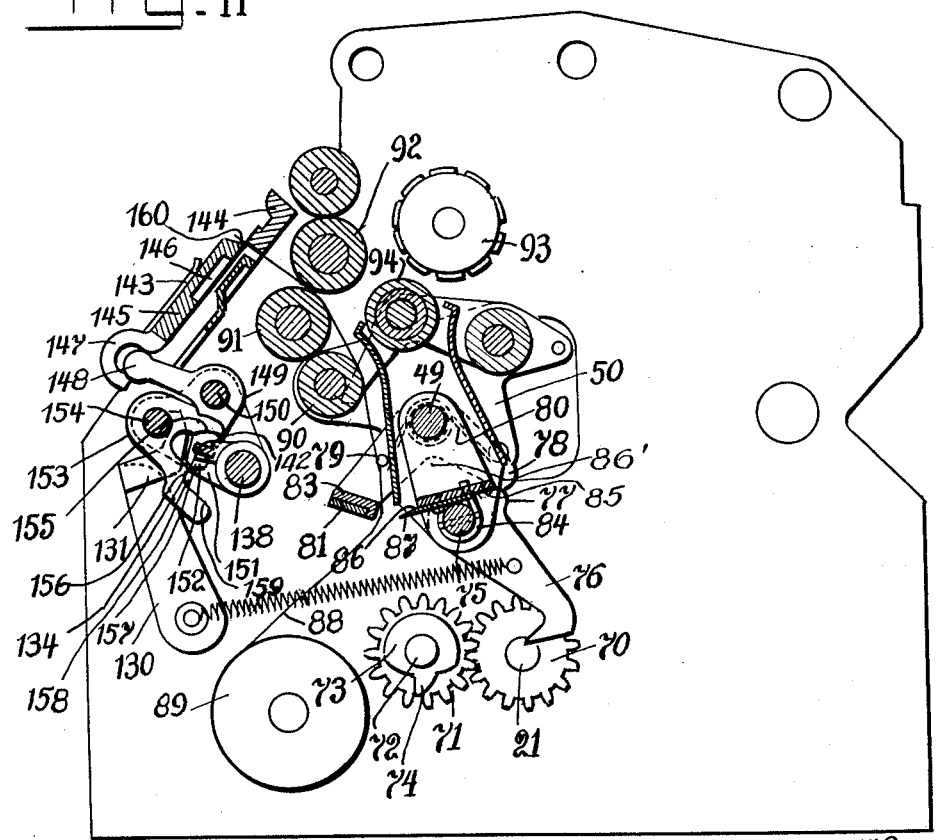
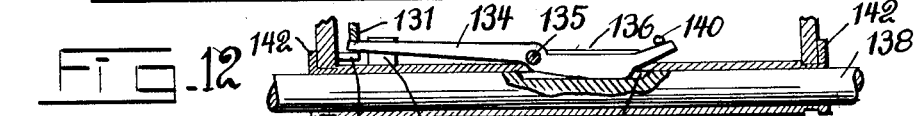
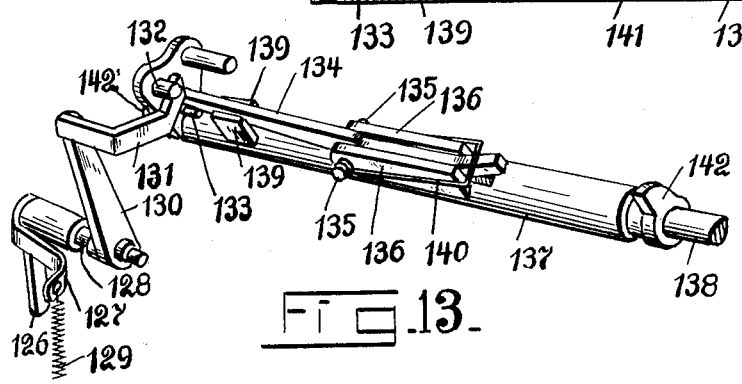
INVENTOR.
Robert B. Long
BY
H. W. Baker
ATTORNEYS.

May 29, 1934.  R. B. LONG  1,960,948
REGISTER
Filed July 1, 1929   7 Sheets-Sheet 6
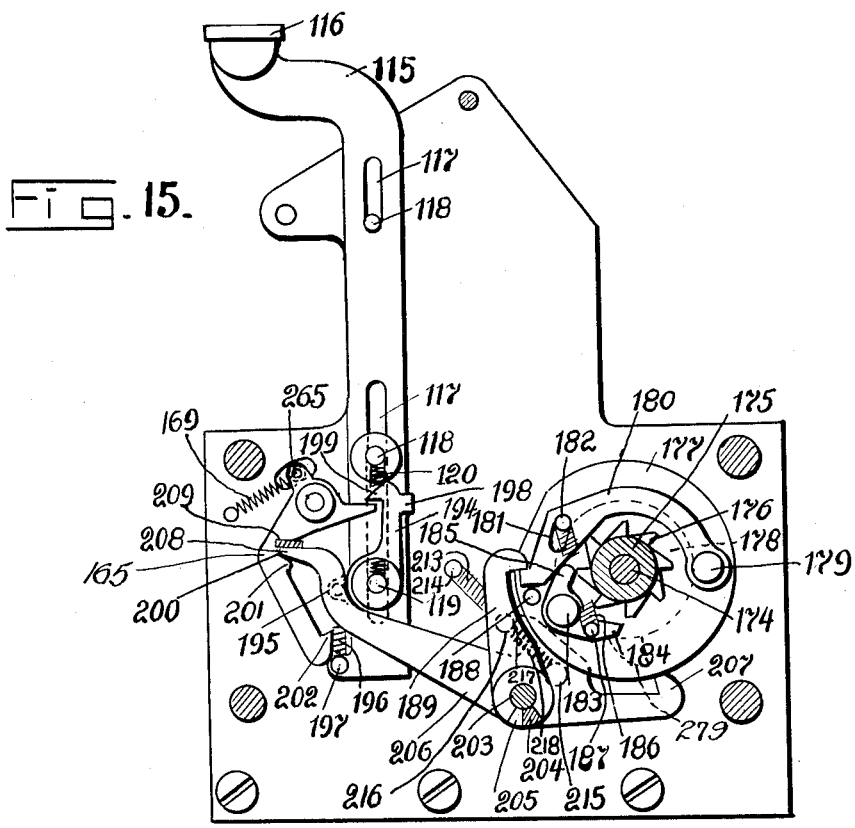
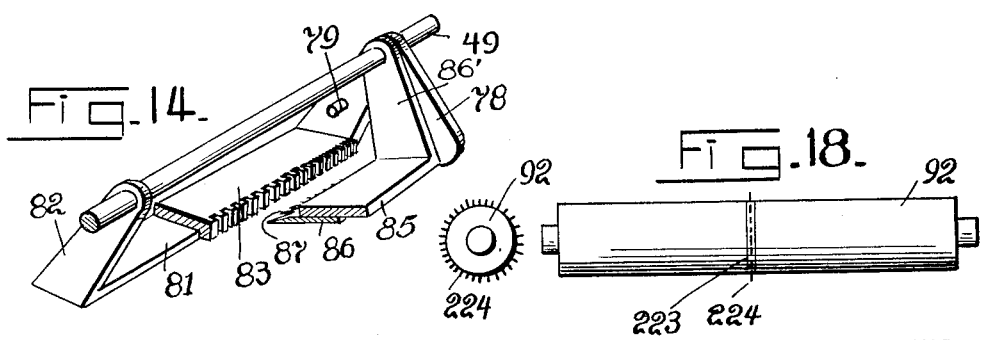
INVENTOR.
Robert B. Long
BY H W Baker
ATTORNEYS.

May 29, 1934.  R. B. LONG  1,960,948
REGISTER
Filed July 1, 1929  7 Sheets-Sheet 7
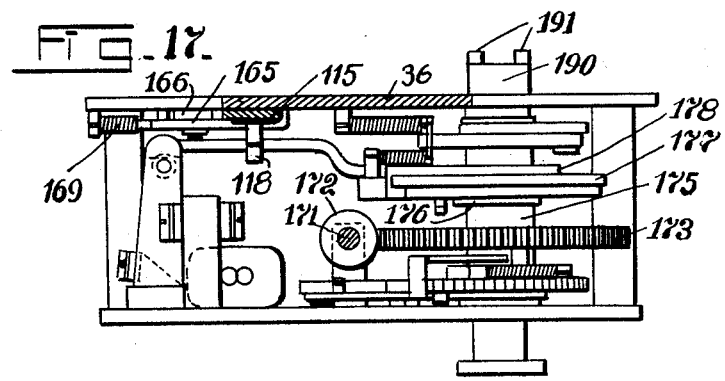
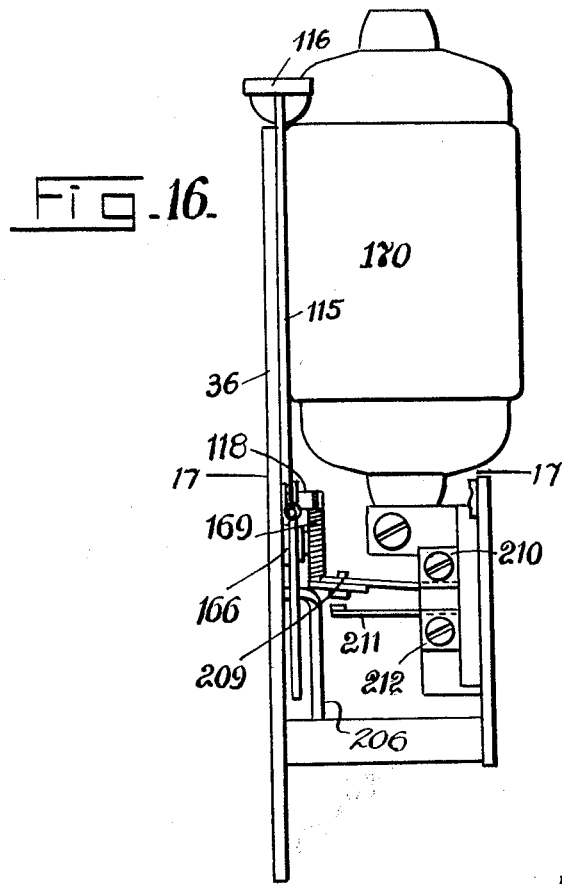
INVENTOR.
Robert B. Long
BY H. W. Baker
ATTORNEYS.

Patented May 29, 1934

1,960,948

UNITED STATES PATENT OFFICE 1,960,948

REGISTER

Robert B. Long, Dayton, Ohio, assignor to Ohmer Fare Register Company, Dayton, Ohio Application July 1, 1929, Serial No. 375,013

23 Claims. (Cl. 235—31)

This invention relates to an improvement in registers whereby it is possible to issue a plurality of tickets in coupon form attached together with perforations between each one of the coupons or tickets and the last of the tickets being severed from the ticket supply roll. Another object of the invention is to provide means to automatically cut off the motor when the last ticket has been issued and severed. Another object of the invention is to provide a stop mechanism so that the machine may be stopped after each ticket is issued so as to give the operator time to change the keys which set up the variable printing mechanism. For instance, it might be desirable to issue a railway ticket with a plurality of coupons, each of said coupons being good for passage between different stations. In this case it is desirable that all coupons should be attached together forming one long ticket with perforations between the various coupons thereof and the last ticket being severed from the paper roll. Another object of the invention is to provide novel and improved means whereby the serial number mechanism will not be advanced while the machine is printing the various coupons forming one ticket. Another object of the invention is to provide novel means whereby the number of coupons to be issued will be set up before operating the machine and means to permit the re-setting of said means in case it is incorrectly set. For instance, a person might go to a theater and ask for 3 tickets. The operator should then set the indexing means so as to indicate the number 3. If, however, he should set it to 9 through error means are provided whereby he can rectify this mistake. Other objects of the invention will appear in the detailed description which follows in conjunction with the drawings in which Fig. 1 is a perspective view of the motor cabinet showing parts of the indexing and stop mechanism.

Fig. 6 is an elevational view of the mechanism mounted on the front plate of the motor housing shown in Fig. 1 but taken from the inside thereof.

Fig. 7 is a detailed view of the indexing lever and ratchet shown in Fig. 6.

Fig. 8 is a perspective view of the knife control lever and its cam as shown in Fig. 6.

Fig. 9 is an elevational view of the motor operating key and a part of the mechanism controlled thereby.

Fig. 10 is a detailed view of the lever shown in Fig. 4 which controls the motor and the consecutive numbering device and certain parts associated therewith.

Fig. 11 is an elevational view partly in cross-section of the knife mechanism and perforating and printing parts.

Fig. 12 is a fragmentary view of the mechanism by which the cam sleeve which operates the knife mechanism is connected to the operating shaft therefor.

Fig. 13 is an elevational view of the parts shown in Fig. 12 and the means to control the operation of said parts.

Fig. 14 is an elevational view of a part of the perforating means for the ticket strip.

Fig. 15 is a side elevational view of the motor control mechanism.

Fig. 16 is an end view of the motor.

Fig. 17 is a plan view thereof taken on the line 17—17 of Fig. 16; and

Fig. 18 is a side elevational view and an end view of the platen which carries a part of the perforating means.

Figure 1:
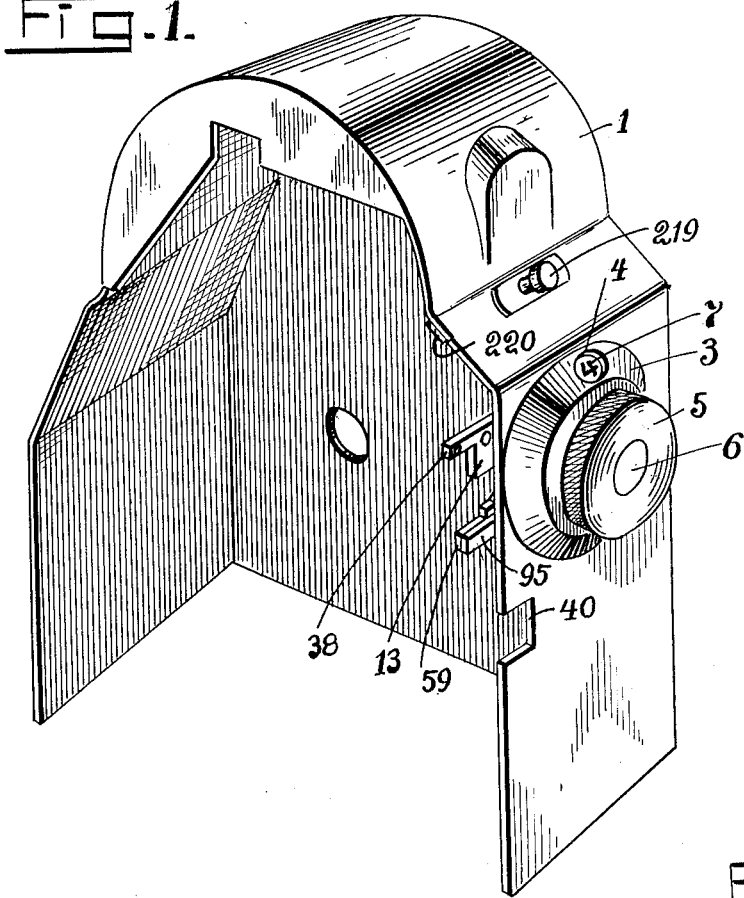

By way of illustration I have shown my invention as applied to that type of register disclosed in the application of Albert S. Wheelbarger and Grover C. Coil, Serial Number 65,532, filed October 29, 1925, and the application of Albert S. Wheelbarger, Serial Number 176,516, filed March 18, 1927.

A housing 1 is placed around the motor casing 2. On the front plate of the motor housing I have provided a flange 3 substantially in the shape of a frustum of a cone which flange is integral with the housing and is provided with an aperture 4. Journaled in this flange is an indexing knob 5 mounted on a shaft 6 which carries an indexing plate 7 on which are written various numbers from zero to ten inclusive which numbers appear beneath the aperture 4 and are readable therethrough. If desired more numbers can be used. On the inside of the motor housing 1 the shaft 6 is provided with a ratchet 8 a circular disk 9 which carries a cam 10 and a circular disk 11 which carries a cam 12.

Figure 2:
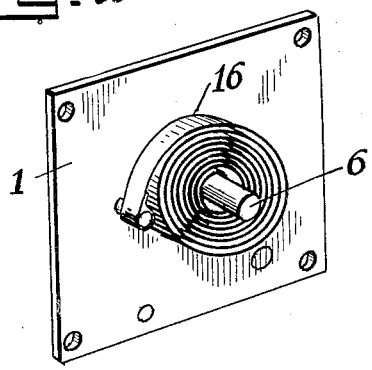
Fig. 2 is a perspective view of the spring means by which the indexing knob is returned towards zero after the machine operates.
Figure 5:
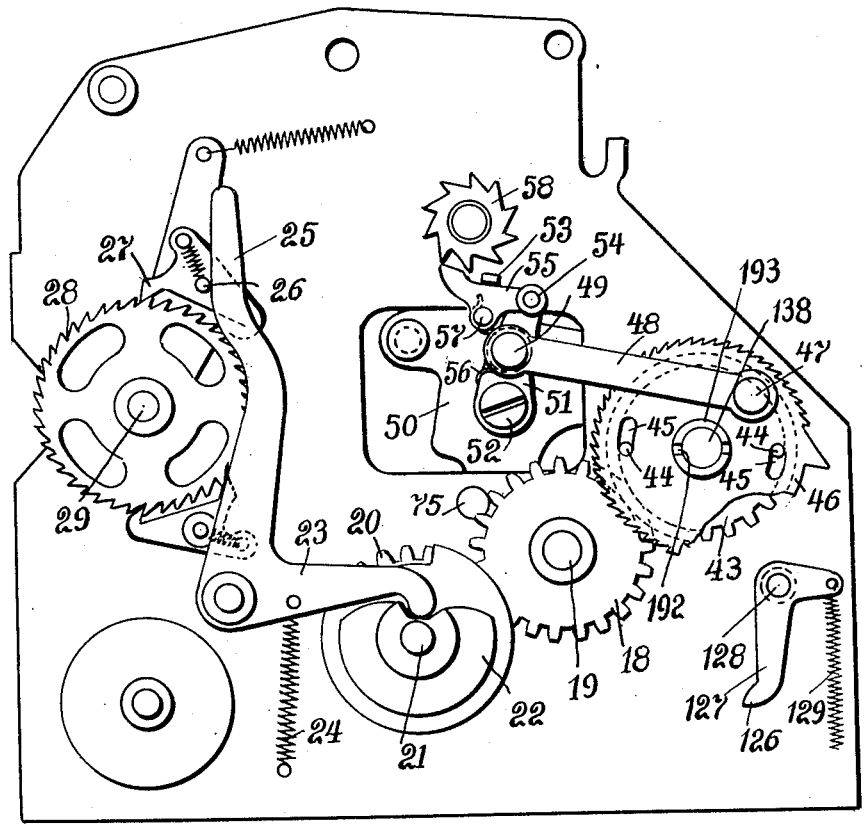
Fig. 5 is an elevational view of one of the side walls of the machine having various operating parts mounted thereon.

Co-acting with the ratchet 8 is an indexing lever 13 which is in form of an escapement lever which lever is mounted on a stud 14 and is provided with an arm 15 which acts as a part of the escapement mechanism so that when the lever 13 is raised the arm 15 is brought into engagement with the ratchet 8 the parts being arranged so that upon one upward and downward movement of the lever 13 the ratchet 8 will be permitted to turn for a distance of one tooth and will then be stopped which structure is well-known and does not require detailed description. This movement of the shaft 6 is caused by a spring 16 as shown in Fig. 2 which spring has its opposite ends secured to the housing 1 and the shaft 6 and tends to cause the shaft 6 to rotate so as to move the indexing plate 7 towards its zero position. The indexing lever 13 is normally pulled downwardly by means of a spring 17. In Fig. 5 I have shown a gear 18 driven by a main operating shaft 19 which is driven from any suitable source of power such as by motor or by a hand crank. The gear 18 drives a gear 20 mounted on a shaft 21 which carries a cam 22. All of these parts make one complete revolution at each operation of the machine and the cam 22 moves the bell crank lever 23 in a counter-clockwise direction during such movement and when the revolution is completed the spring 24 pulls this lever back into the position shown in Fig. 5. The bell crank lever also carries a spacing arm 25 which engages a pin 26 which operates a pawl 27 which rotates a ratchet 28 mounted on a paper shaft 29 so as to correctly space the paper.

Figure 4:
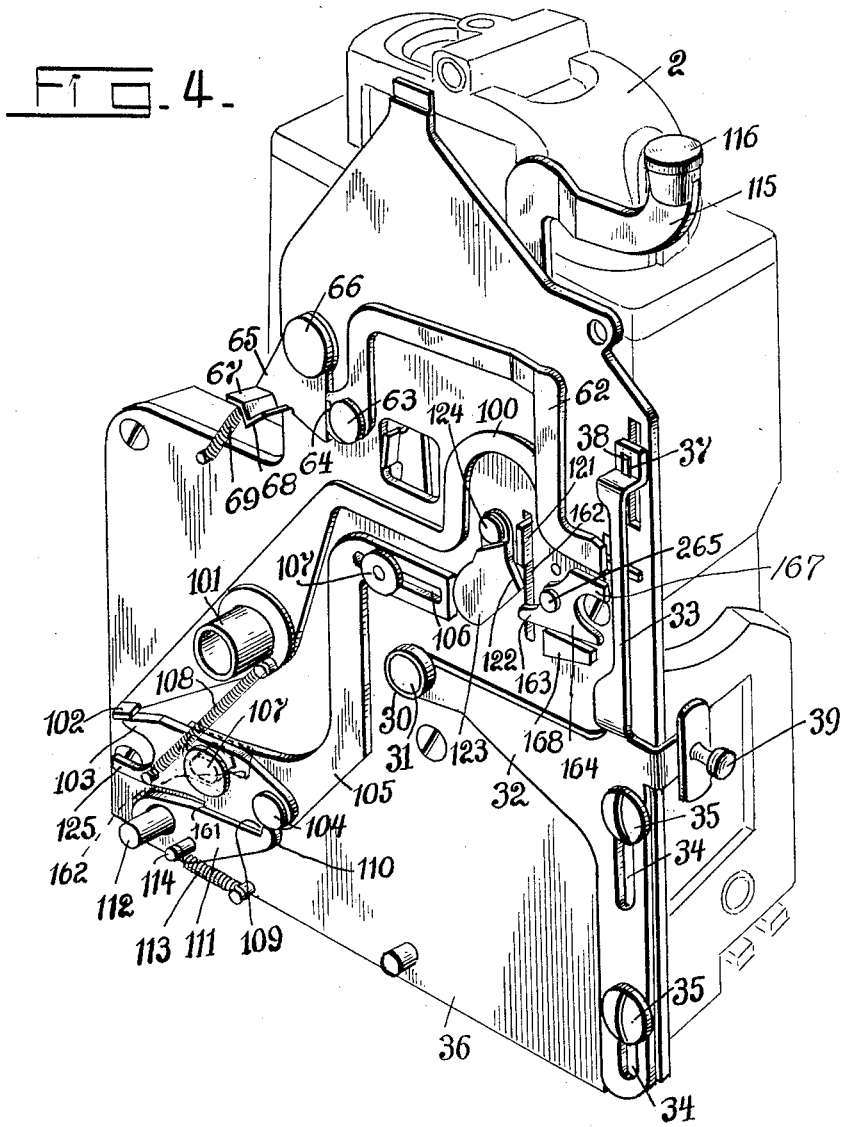
Fig. 4 is an elevational view of the motor housing showing various parts mounted thereon.

As the lever 23 is thus raised it engages a roller 30 (Fig. 4) which roller lies immediately above the right-hand end of the lever 23 (Fig. 5) which roller 30 is mounted on a pin 31 carried by an arm 32 which is a branch of and integral with a lifting plate 33 which is provided with guide slots 34 through which pass guiding studs 35 secured to the plate 36 of the motor. The upper end of plate 33 is provided with an aperture 37 through which extends the end 38 of the indexing lever 13 (Figs. 1 and 4). Each time, therefore, that the machine is operated the said indexing lever 13 is raised by the lifting plate 33 and is then lowered by means of the spring 17 and the paper shaft 29 is also spaced.

The lifting plate 33 may be also raised by means of a knob 39 carried by the lifting plate 33 which projects through an aperture 40 in the housing 1. If the operator made a mistake and rotated the knob 5 insufficiently so that he would set up the number four when he should have set up the number five he can continue this rotation to the correct point the same as when he originally sets up the number by simply rotating the knob. However, if he had set up the number five when he should have set up the number four he could not rotate the knob 5 in a reverse direction on account of the escapement lug 41 carried by the indexing lever 13. He could, however, raise the knob 39 and thereby elevate the lifting plate 33 and the indexing lever 13 so as to free the escapement lug 41 from the ratchet 8, but this movement would bring the escapement lug 42 into engagement with the ratchet 8 and permit it to rotate the distance of one tooth reversely, that is in the instance cited from five to four. By this means he can correct the setting of the indexing knob when he has incorrectly set the same.

In Fig. 5 I have shown a gear 43 meshing with the gear 18 which gear carries pins 44 which pass through slots 45 in a disk 46 which disk carries a pin 47 which operates a pitman 48 whose outer end receives a shaft 49 carried by an oscillating printing carrier 50. An arm 51 is secured to the printing carrier 50 by means of the shaft 49 and a stud 52 and carries an upwardly projecting stop lug 53. A pin 54 carried by the arm 51 is the pivot for a pawl 55 which is normally urged upward by means of a spring 56 which has one end secured to the arm 51 and passes around the shaft 49 and presses upwardly against a pin 57 carried by the pawl 55. The pawl 55 actuates a ratchet 58 forming a part of the consecutive counter mechanism. Unless some means is provided to overcome the tension of the spring 56 the consecutive counter would therefore be actuated one step each time the machine is operated. Such a means however is provided as described below.

Mounted on the stud 14 is a lever 59 provided with a lug 60 which is pulled into engagement with the disk 11 and cam 12 by means of a spring 61. This lever is normally pulled downwardly by said spring until the cam 12 which corresponds with the zero position of the indexing knob raises the lug 60 and thereby the lever 59 which lever then raises the lever 62 (Figs. 4 and 10) which lever is pivoted on a stud 63. The lever 62 is provided with a very short arm 64 which extends beyond the stud 63 and engages a consecutive number controlling arm 65 pivoted on a stud 66. This arm 65 is provided with a laterally extending flange 67 provided with a V-shaped surface 68. The arm 65 is pulled towards the arm 64 by means of a spring 69. When therefore the cam 12 raises the lever 59 the V-shaped surface 68 of the controlling arm 65 is rotated clockwise and is raised above the point where it will interfere with the passage of the pin 57 (Fig. 5) of the consecutive numbering device. When, however, the indexing knob is set at any number greater than zero, the lever 59 will be in depressed position and the V-shaped surface 68 of the consecutive number controlling arm 65 will be in the path of movement of the pin 57 carried by the pawl 55 and as the pitman 48 makes its to and fro movement the V-shaped surface 68 will prevent the pawl 55 from engaging the ratchet 58 so that the consecutive numbering device cannot be advanced until the indexing plate reaches the numeral zero. If, therefore, there are ten coupons to be printed forming one ticket all of these tickets will have the same serial number, but just as the machine comes to rest the consecutive number controlling arm 65 will be elevated and the pitman 48 will operate the pawl 55 and advance the ratchet 58 one step so that when the machine comes to rest the consecutive number for the next ticket has already been set up.

In many instances it is desirable to perforate between the various coupons forming a ticket and to sever only the last ticket from the paper strip. In connection with Fig. 5 I described the operation of the shaft 21 which shaft is also shown in Fig. 11. This shaft carries a gear 70 which rotates in a clockwise direction and meshes with a gear 71 mounted on a shaft 72 which shaft and gear carry a cam plate 73 provided with a cam 74. The oscillating printing carrier 50 is loosely mounted on a shaft 75 which has rigidly mounted thereon an arm 76 provided with a cam lug 77 which engages with one end of a bell crank lever 78 pivoted on the shaft 49. The lever 78 is provided with a pin 79 which co-acts with a spring 80 which tends to hold the lever 78 in engagement with the cam lug 77. On the lower end of the bell crank lever 78 and remote from the part that contacts with the cam lug 77 is a bar 81 which is integral with an arm 82 mounted on the said shaft 49. This bar 81 is provided with a channel member 83 extending transversely over one edge of the bar as shown in Fig. 14. An arm 84 is pinned to the shaft 75 which arm projects through a plate 85 to which is affixed a serrating plate 86 provided with teeth 87. The plate 85 is integral with arms 86' mounted on shaft 49.

The ticket strip 88 is fed from a roll 89 and passes upwardly between the channel member 83 and the serrating plate 86 and over the platen 90 carried by the oscillating printing carrier 50 from whence it passes between the feed roller 91 and a platen 92. As the shaft 21 rotates once for each complete forward and backward movement of the oscillating printing carrier 50 the arm 76 is moved into engagement with the cam plate 73 once during such operation. As the cam 74 strikes the lower end of the arm 76 it moves it to the right as viewed in Fig. 11 which rotates the shaft 75 anti-clockwise which correspondingly moves the arm 84, plate 85 and serrating plate 86 and at this same time the cam lug 77 rotates the bell lever 78 anti-clockwise moving the bar 81 and channel member 83 toward the serrating plate 86, the teeth 87 extending within the channels of the channel member 83 and thereby serrating or perforating the ticket strip 88. The platen 90 as the printing carrier is moved to the right in Fig. 11 engages the paper and brings it beneath the printing wheels 93 after they have been inked by the ink roller 94 thereby printing the variable data which may be set up on said printing wheels. It will be noted that the paper is not continuously fed for it is not pulled forwardly until the platen 90 engages the same so that there is a period of rest in the movement of the paper and it is during this period of rest that the channel member 83 and the serrating plate 86 engage the paper and serrate it. The paper is therefore serrated while it is at rest and there is no tearing of the paper. The means to intermittedly operate the feed roller 91 and the platen 92 form no part of this invention and therefore are not shown. Every coupon is therefore serrated or perforated regardless of whether it is afterwards severed as hereinafter described.

A knife control lever 95 is mounted on the stud 14 and is provided with a cam lug 96 and a stud 97 to which is attached a spring 98 anchored to a pin 99 carried by the motor housing 1 which spring pulls the cam lug 96 into engagement with the disk 9 and cam 10 and holds the lever 95 in depressed position until it is raised by the cam 10 engaging the cam lug 96 which is immediately after the next to the last coupon has been issued or just prior to the time the indexing plate indicates the numeral 1. The outer end of the lever 95 lies beneath the knife control lever 100 which is pivoted on a shaft 101 and carries at its lower end a laterally extending lip 102 which overlies the free end of a trigger member 103 fulcrumed on a pin 104 which pin is mounted in a slide member 105 provided with slots 106 through which extend pins 107 which serve as guides for the slide member 105. The trigger member 103 is held in engagement with the lip 102 by means of a spring 108 and is provided with a shoulder 109. When the trigger member 103 is moved to the left as viewed in Fig. 4 it will engage a lug 110 on the catch 111 which catch is pivoted on a pin 112 and is normally pressed upwardly by means of a spring 113 which engages a pin 114 which is below the fulcrum pin 112.

A motor control key 115 is provided with a button 116 and is depressed by the operator when he desires to operate the machine electrically. This key is provided with slots 117 through which extend pins 118 carried by a fixed part of the machine which pins serve to guide the said key. It is also provided with a stud 119 and a spring 120 connects the stud 119 and the lower of the pins 118 so as to hold the key in elevated position except when its tension is overcome by the operator. The motor control key 115 is provided with a lug 121 (Figs. 9 and 4) which projects through the plate 36 and engages a cam surface 122 of a member 123 pivoted on a pin 124 which member 123 engages the right-hand end of the slide member 105.

The trigger member 103 is provided with an arm 125 (Fig. 4) which engages with an arm 126 of a bell crank lever 127 rigidly mounted on a shaft 128 and which arm 126 is held in engagement with the arm 125 by means of a spring 129. Secured to the shaft 128 is a lever 130 as best shown in Fig. 13 which arm has an off-set extension 131 which engages a pin 132 attached to a fixed part of the machine. A stop pin 133 is likewise carried by a fixed part of the machine at a sufficient distance from the pin 132 so that the arm 131 will be permitted to move for a slight distance sufficient to rock the lock arm 134 pivoted on a pin 135 carried by arms 136 of a sleeve 137 loosely mounted on a shaft 138 on which the gear 43 is rigidly mounted so that said shaft is given one rotation at each operation of the machine. The sleeve 137 also carries guide arms 139 to guide the lock arm 134. A spring 140 is secured to the pin 135 and extends to the side of arms 136 and across the end of the lock arm 134 remote from the lever 130 so as to tend to depress the lock arm 134 into a groove 141 in the shaft 138. The sleeve 137 is provided with cams 142. A spring 143 is secured to the stationary knife 144 by any convenient means which spring extends forwardly of the knife and presses the movable knife 145 toward the stationary knife 144. The movable knife 145 is provided with a channel 146 which extends throughout the length thereof and from a point shortly beneath the top or cutting edge thereof to near the bottom.

The lower portion of the movable knife 145 is provided with a hook 147 which receives a knob 148 of a bell crank lever 149 pivoted on a pin 150 secured to a plate 151 secured to a fixed part of the machine. The other end of the bell crank lever 149 is provided with an off-set lug 152 which projects into the path of movement of the cam 142. A bell crank lever 153 is rotatably mounted on a cross bar 154. One arm of the bell crank lever 153 is provided with a cam surface 155 which is engaged by the said cam 142. The other arm of the bell crank lever 153 is provided with a cam lug 156 which engages the lower beveled edge 157 of the off-set lug 152. Beyond the cam lug 156 is a recess 158 to receive the lug 152 and the second arm of the bell crank lever 153 terminates in a cam portion 159. There is one set of mechanism described in this paragraph on one side of the machine and another set on the other side of the machine so that both ends of said knife will be simultaneously actuated.

When the sleeve 137 commences its clockwise rotation Fig. 11 the cam 142 moves into engagement with the cam surface 155 rotating the bell crank lever 153 upwardly so that the cam lug 156 engages the lower beveled end 157 of the lug 152 rotating the bell crank lever 149 downwardly and lowering the movable knife 145. The movable knife 145 is now held in this position by the lug 152 engaging the forward side of the recess 158. As the cam 142 continues this rotation it engages the cam portion 159 of the bell crank lever 153 rotating the lever 153 downwardly and thereby lowering the forward edge of the recess 158 below the lug 152. The cam 142 now engages the lug 152 of the bell crank lever 149 rotating the same upwardly and raising the knife so as to sever the paper strip 88 which passes out of the exit 160. When the cam 142 has passed the lug 152 it engages for a second time the cam surface 155 rotating the bell crank lever 153 upwardly so that the cam lug 156 again engages the beveled end 157 of the lug 152 thereby slightly rotating the bell crank lever 149 downward and lowering the knife 145 thereby completing the operation.

The knife therefore is held inoperative unless the index plate indicates one and the machine is then operated. If it is at any other number the knife control lever 95 is held in depressed position and the right-hand end of the lever 100 is likewise depressed while the catch 111 engages the shoulder 109 on the trigger member 103 holding the said trigger member so that the arm 125 engages the arm 126 of the bell crank lever 127 depressing the left-hand end of the lock arm 134 (Fig. 13) and elevating the right-hand end thereof out of the groove 141 so that while the shaft 138 makes its rotation each time a coupon is printed, the knife does not operate for the knife is controlled by the cams 142 which are carried on the sleeve 137. When, however, the index plate shows the numeral one the cam 19 engages the cam lug 96 of the knife control lever 95 and elevates it against the tension of the spring 98. Since the outer end of the lever 95 projects under the knife control lever 100 it raises the right-hand end thereof as viewed in Fig. 4 so that the lip 102 depresses the left-hand end of the trigger member 103 and the shoulder 161 of the trigger member 103 depresses the catch 111 so as to disengage lug 110 of the catch 111 from the shoulder 109 of the trigger member 103. The spring 108 now moves both the trigger member 103 and the slide member 105 towards the right as viewed in Fig. 4 and disengages the arm 125 from the arm 126 of the bell crank lever 127 and the spring 129 elevates the extension 131 of said bell crank lever so as to permit the spring 140 to depress the right-hand end of the lock arm 134 into the groove 141 of the shaft 138 so that upon this last rotation of the shaft 138 the sleeve 137 is locked therewith and rotates with it severing the printed strip from the unprinted ticket strip.

It is also desirable to cut off the motor after the last coupon or ticket has been issued and severed. This is accomplished by the said lever 59 which it will be remembered projects under the lever 62 (Figs. 4, 6 and 10). When the operator presses downwardly on the button 116 and thereby depresses the motor control key 115 he moves downwardly the lug 121 carried by said key which lug is guided by the sides of a slot 162 in the plate 36 (Fig. 4). Near the end of this downward movement the said lug 121 engages an arm 163 of a holding member 164 pivoted on a pin 265 carried by an arm of the lever 165 which pin extends through the plate 36 (Fig. 9) and serves as controlling means for a bell crank lever 165 pivoted on a pin 166 carried by the side wall 36.

This downward movement of the lug 121 raises the right-hand arm 167 of the holding member 164 which slightly raises the lever 59 so that the arm 167 can pass to the left as shown in Fig. 10. A lug 168 is secured to the plate 36 to guide the holding member 164. As soon therefore as the key is depressed the holding member 164 becomes seated behind the lever 59 so that the holding member 164 cannot move to the right as viewed in Fig. 10. This movement has caused the bell crank lever 165 to rotate clockwise as viewed in Fig. 9 in which position the motor will continue running indefinitely as will be hereinafter described. When, however, the last ticket is printed the lever 59 will be raised by the cam 12 so that the said lever will no longer hold the holding member 164 and the spring 169 will rotate the bell crank lever 165 counterclockwise in which position the motor will be stopped as hereinafter described.

The motor 170 is provided with a shaft 171 which carries a screw 172 which drives a gear 173 which gear is rotatably mounted on the shaft 174. The gear 173 is provided with a collar 175 which carries a ratchet 176. A disk 177 is secured to the said shaft 174 and to a disk 178 which disk carries a cam 279 as best shown in Fig. 15. Secured to the disk 177 is a pin 179 which carries a catch 180 pivoted thereto which catch is provided with a slot 181. A pin 182 is secured to the disk 177 and projects through said slot 181. A pin 183 is likewise attached to the disk 177 and rotatably mounted on said pin is a pawl 184 provided with an arm 185. A spring 186 connects the said pin 182 to a pin 187 carried by said pawl 184 which spring always maintains the arm 185 in engagement with the lower surface of the catch 180. A stop pin 188 is provided on the disk 177 which pin serves as a stop for the left hand end of the catch 180. As shown in Fig. 15 a locking and releasing arm 189 is holding said catch 180 downwardly in engagement with the pin 183 and the lower surface of said catch has cammed the arm 185 to the right so as to disengage the pawl 184 from the ratchet 176 so that if the motor is running the gear 173 and ratchet 176 will be rotated but this rotation will not be imparted to the shaft 174. If, however, the arm 189 should be moved to the left so as to disengage the catch 180 the spring 186 will pull upwardly on the pawl 184 so as to cause it to engage the ratchet 176 and incidentally would cam the left-hand end of the catch 180 upwardly by means of the arm 185 so that if the motor were running under these conditions the motor would not only drive the gear 173 and ratchet 176 but would through the pawl 184 and disk 177 drive the shaft 174 to which is rigidly secured a collar 190 having tongues 191 which fit into groove 192 in a collar 193 secured to the shaft 138 (Fig. 5) which serves as a driving means for the machine.

A tripping member 194 is pivoted on the pin 119 which tripping member is provided with an arm 195 which in turn is connected to a pin 197 at the lower end of the key 115 by means of a spring 196. The tripping member 194 is also provided with an arm 198 which bears against the inner edge of the key 115 and serves as a stop to resist the tension of the spring 196. The tripping member is provided with a lug 199 which when the key 115 moves downwardly engages the right-hand end of the bell crank lever 165 as shown in Fig. 15 and rotates said bell crank lever clockwise. The bell crank lever 165 is provided with a recess 200 formed immediately above a lug 201 and is also provided with a lug 202 at the extreme lower end thereof.

The locking and releasing arm 189 is loosely mounted on a shaft 203. The said arm 189 is provided with a recess 205 which receives a lug 204 carried by a lever arm 206 which lever arm carries at its right-hand end a lug 207 adapted to be actuated by the cam 279 and at its other end is provided with a lug 208 which is adapted to be seated in either the recess 200 or immediately above the lug 202 of the bell crank lever 165. This lever arm 206 is adapted to lift a spring contact arm 209 which extends to a terminal 210 connected with an electrical source of energy. When the lever arm 206 is seated in the recess 200 this spring contact 209 is raised out of engagement with a stationary contact 211 secured to a terminal 212. When these spring contacts are in engagement the circuit is completed and they will be in engagement when the lever arm 206 is disengaged from the lug 201 and moves downwardly until stopped by the lug 202 which movement of the said lever arm 206 is caused by a spring 213 secured to a pin 214 carried by the plate 36 and to a pin 215 carried by said lever 206. The releasing arm 189 also carries a pin 216 which is engaged by a shoulder 217 of the lever arm 206 and a spring 218 extends from said pin 216 carried by said releasing arm 189 to said pin 215 carried by said lever arm 206 so as to always hold the releasing arm 189 in engagement with the shoulder 217 of the lever arm 206.

When the key 115 is depressed the lug 199 engages the right-hand end of the bell crank lever 165 and rotates it clockwise disengaging the lug 208 of the lever 206 from the lug 201 of the bell crank lever 165 and the spring 213 rotates the lever arm 206 counter-clockwise so that the shoulder 217 carried thereby engages the right-hand side of the releasing arm 189 and therefore rotates the releasing arm 189 counter-clockwise and out of engagement with the catch 180 whereupon the spring 186 pulls the pawl 184 upwardly into engagement with the ratchet 176 and thereby connects the driving gear 173 with the shaft 174 and thereby drives the machine for one rotation. At the end of this rotation the cam 279 engages the lug 207 of the lever arm 206 and rotates the said lever arm clockwise thereby carrying the movable spring contact 209 out of engagement with the stationary contact 211 thereby breaking the circuit and the spring 217 pulls the locking and releasing arm 189 to the right so that it engages the left-hand end of the catch 180 depressing the said catch and thereby rotating the pawl 187 in a clockwise direction against the tension of the spring 186 and releasing said pawl from said ratchet 176. This construction allows the heavy motor to continue its rotation until it runs down but the machine does not partake of this rotation and comes to an abrupt stop and with a minimum of strain as soon as the pawl is disconnected from the ratchet.

However, when a plurality of tickets are being issued in coupon form it may or may not be desirable for the motor to thus stop after each rotation of the shaft 174.

The construction heretofore described in connection with Figs. 9 and 10 permits the motor to continue running and to operate the shaft 174 until the last ticket of a series is issued for it will be remembered that the bell crank lever 165 has been rotated clockwise so that after each rotation of the shaft 174 the lever 206 will move upwardly adjacent to the recess 200 but the lug 201 is held too far to the left of the left-hand end of the arm 206 to engage the same so that as soon as the cam 279 passes the lug 207 the arm 206 falls on account of the tension exerted upon it by the spring 213 and the locking and releasing arm 189 is disengaged from the catch 180 so that the pawl 184 engages the ratchet 176 and therefore a second rotation is permitted of the shaft 174 which movement will continue until the last coupon of a series has been issued at which time the lever 59 is raised above the arm 167 and there is therefore nothing to restrain the movement of the holding member 164. The spring 169 therefore pulls the holding member 164 by means of the pin 265 and rotates the bell crank lever 165 anti-clockwise so that at completion of the issuing of the last ticket and after the lever arm 206 is raised the lug 201 is in position to prevent the lever arm 206 again falling so that the electric circuit is broken and there is no driving connection between the motor and the machine.

Figure 3:
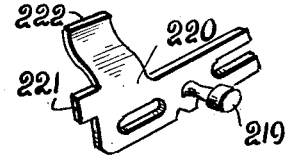
Fig. 3 is a perspective view of the means whereby the motor may be stopped between the issuance of successive tickets.

When it is desired to run the motor a plurality of times as heretofore described the knob 219 (Figs. 1 and 3) should be in its right-hand position so that the key 115 will not be stopped by the plate 220 secured to the knob 219. If it is desirable for the machine to stop between the printing of the successive coupons the knob 219 is moved to the left as viewed in Fig. 1 so as to bring the stop shoulder 221 in the path of movement of the key 115 so as to limit its downward movement. This shoulder 221 prevents the key 115 being moved downwardly sufficiently for the lug 121 to engage arm 163 of the holding member 164 so that the arm 167 does not engage behind the lever 59 and the pin 265 does not rotate the bell crank lever 165. When, therefore, the shaft 174 has made a revolution the cam 279 rocks the left-hand end of the arm 206 upwardly and breaks the circuit and the lever arm 206 engages above the lug 201 and is held thereby in its elevated position. When therefore the shoulder 221 is in position to stop the downward movement of the key 115 the motor is cut off after each rotation of the shaft 174 and the machine will stop with a minimum of jar or strain even though the motor continues to run through inertia for a certain length of time. When the key 115 is stopped by the shoulder 221 it has however moved far enough so that the lug 199 of the tripping member 194 has engaged the bell crank lever 165 so as to disengage the lug 201 from holding the lever arm 206 so that the circuit is completed and the motor runs but as before mentioned after it has run sufficiently to turn the shaft 174 one revolution it is cut off.

If it is desired to lock the machine so that the key 115 cannot be depressed at all the knob 219 is moved to its extreme left-hand position as viewed in Fig. 1 so that the stop 222 would be engaged by the key 115.

I have therefore provided means whereby the machine may be locked against operation or whereby it may be caused to issue one ticket and then stop or whereby the motor will automatically operate the machine for any predetermined number of operations and after operating it for such number of operations the motor will be automatically disconnected.

As before mentioned means are provided to perforate between each one of the tickets or coupons forming a series so that the one can be readily detached from the other. It is also some-times desirable to perforate each one of the tickets or coupons from the top to the bottom thereof. For instance in theaters it is common for the doorkeeper to take one half of the ticket and to give the other half to the patron so that he can present the same to the usher. Means are provided whereby such vertical perforations may be secured which means consist of a ring 223 mounted on the platen 92 which ring is provided with projections 224 or pins which press through the paper as the paper passes between the feed roller 91 and the platen 92.

If it is desired to issue a number of tickets forming a series and all having the same consecutive number and it is further desired that each of the coupons forming the series should be completely severed from the remainder the same can be accomplished by simply omitting any of the parts which control the lock arm 134 or by securing the sleeve 137 to the shaft 138. The knife would then operate to sever the various coupons from each other.

If it is desired to issue a plurality of tickets having different serial numbers and for each of the tickets to be severed the levers 95 and 62 can be eliminated as well as the parts controlled thereby. If the lever 95 is eliminated each ticket will be severed from the remaining tickets and if the lever 62 is eliminated each of the tickets will bear a different serial number.

If it is desired to issue more tickets in a series than is the maximum number shown on the dial 7 the same can be accomplished by setting up the maximum number, such as 10, shown on said dial and then after touching the motor key, hold the knob 5 against rotation until the machine has run the number of tickets or coupons which represents the difference between the number desired and the maximum number on the disc 7. For instance suppose the highest number on the disc 7 was ten, and we desire to run sixteen tickets in coupon form attached together. The operator would set the disc 7 so as to show ten through the aperture 4 and after touching the motor key he would hold the knob 5 until the machine had made six operations and he would then release the knob 5 so that the machine would function as heretofore described. As a matter of fact as long as the knob 5 is held against return rotation the machine will continue to operate indefinitely.

Having now described my invention, I claim:

1. In a machine, means to print and issue any number of tickets in a series, a consecutive numbering device, an actuating means therefor, and means whereby said actuating means is rendered inoperative except once during the printing of all of the tickets of a series.

2. In a machine, means to print and issue any number of tickets in a series, means to sever the last ticket printed from the unprinted ticket paper and means whereby said second mentioned means is rendered inoperative while any ticket except the last of a series is being printed.

3. In a machine, means to print and issue tickets in a series, a driving means therefor, automatic means to disconnect the driving means from the first mentioned means, means to govern whether said driving means will be disconnected after each ticket is printed or only after the last ticket of the series is printed, a severing means, and means whereby the severing means is actuated only after the last ticket of the series is printed.

4. In a machine, means to print and issue tickets in a series, a driving means therefor, automatic means to disconnect the driving means from the first mentioned means, means to govern whether said driving means will be locked against operation or be disconnected after each ticket is printed or only after the last ticket of the series is printed, a severing means, and means whereby the severing means is actuated only after the last ticket of the series is printed.

5. In a machine, means whereby a plurality of tickets may be printed in a series, a setting member, means to return said setting member one step towards its zero position as each ticket is printed, an escapement means to prevent said setting member moving more than one step for each ticket printed and manually operatable means to move said escapement means one step at a time to correct the setting of the setting member without the operation of the machine.

6. In a machine, a motor, means driven by said motor whereby a plurality of tickets may be printed in a strip, a variably movable key and means governed by the extent of movement of said key to either stop said motor after each ticket is printed or only after the last ticket is printed.

7. In a machine, a motor, means driven by said motor whereby a plurality of tickets may be printed in a strip, a variably depressible motor key, means to prevent said motor key being fully depressed and means governed by the extent of depression of said key to stop said motor either after each ticket is printed or only after the last ticket is printed.

8. In a machine, means whereby a plurality of tickets may be printed in a continuous strip, a shaft, means whereby said shaft is rotated each time said machine is operated to print a ticket, a sleeve on said shaft, means to connect said sleeve and shaft only during the time the last ticket of said strip is being printed and means operated by said sleeve to sever the last ticket from the supply strip of paper.

9. In a machine, a driving means, driven means operated by the driving means to print and issue tickets in a series, means controlling the number of tickets to be issued, means to correct an incorrect setting of said controlling means, means to disengage the driving means from the driven means after each ticket is issued, a severing means, and means to operate the severing means only when the last ticket is printed.

10. In a machine, a driving means, means driven thereby to print and issue any number of tickets in a series, a consecutive numbering device, an actuating means therefor, means whereby said actuating means is rendered inoperative except once during the printing of all of the tickets of a series, and means whereby the driving means is disconnected from the driven means after each ticket is printed.

11. In a machine, a driven means to print and issue any number of tickets in a series, a driving means therefor, means to sever the last ticket printed from the unprinted ticket paper, means whereby the last mentioned means is rendered inoperative while any ticket except the last of a series is being printed, and means whereby the driving means is disconnected from the driven means after each operation of the machine.

12. In a machine, driven means whereby a plurality of tickets may be printed in a series, a driving means therefor, a setting member, means to return said setting member one step towards its zero position as each ticket is printed, means to disconnect said driving means from said driven means after each ticket is printed, a severing means, and means controlled by said setting member to operate the severing means only when the last ticket is printed.

13. In a machine, driven means whereby a plurality of tickets may be printed in a series, driving means therefor, a setting member, means to return said setting member one step towards its zero position as each ticket is printed, an escapement means to prevent said setting member moving more than one step as each ticket is printed, manual operatable means to move said escapement means one step at a time to correct the setting of the setting member without the operation of the machine, and means whereby said driving means is disconnected from said driven means after each ticket is printed.

14. In a machine, a motor, means driven by said motor whereby a plurality of tickets may be printed in coupon form, a variably movable member for rendering the motor effective to drive said means, and means governed by the extent of movement of said member to stop said motor after each ticket of the series is printed.

15. In a machine, a driven means whereby a plurality of tickets may be printed in a continuous strip, a driven means therefor, a shaft, means whereby said shaft is rotated each time said machine is operated to print a ticket, a sleeve on said shaft, means to connect said sleeve and shaft only during the time the last ticket of said strip is being printed, means operated by said sleeve to sever the last ticket from the said paper, and means whereby the driving means will be disconnected from the driven means after each ticket is printed.

16. In a machine, driven means to print and issue tickets in a series, driving means therefor, means to determine the number of tickets to be issued, means to correct an incorrect setting of said determining means, and means to govern whether said driving means will be disconnected from said driven means after each ticket is printed or only after the last ticket is printed.

17. In a machine, driven means to print and issue any number of tickets in a series, a driving means therefor, a consecutive numbering device, an actuating means therefor, means whereby said actuating means is rendered inoperative except once during the printing of all of the tickets of a series, and means to govern whether said driving means will be disconnected from the driven means after each ticket is printed or only after the last ticket is printed.

18. In a machine, driven means to print and issue any number of tickets in a series, a driving means therefor, means to sever the last ticket printed from the unprinted ticket paper, means whereby said severing means is rendered inoperative while any ticket except the last of a series is being printed, and means to govern whether said driving means will be disconnected from said driven means after each ticket is printed or only after the last ticket is printed.

19. In a machine, driven means whereby a plurality of tickets may be printed in a series, a driving means therefor, a setting member, means whereby said setting member controls the number of operations of the driving means, means to return said setting member one step toward its zero position as each ticket is printed, an escapement means to prevent said setting member moving more than one step for each ticket printed, and means to govern whether said driving means will be disconnected from the driven means after each ticket is printed or only after the last ticket is printed.

20. In a machine, driven means whereby a plurality of tickets may be printed in a series, driving means therefor, a setting member, means whereby said setting member controls the number of operations of the driving means, means to return said setting member one step toward its zero position as each ticket is printed, an escapement means to prevent said setting member moving more than one step for each ticket printed, manually operatable means to move said escapement means one step at a time to correct an incorrect setting of the setting member without the operation of the machine, and means to govern whether said driving and driven means will be disconnected after each ticket is printed or only after the last ticket is printed.

21. In a machine, driving means whereby a plurality of tickets may be printed in a continuous strip, a driven means therefor, a shaft, means whereby said shaft is rotated by said driven means one revolution for each operation of the machine, a sleeve on said shaft, means to connect said sleeve and shaft only during the time the last ticket of said strip is being printed, means operated by said sleeve to sever the last ticket from the supply strip of paper, and means to govern whether said driving means will be disconnected from said driven means after each ticket is printed or only after the last ticket is printed.

22. In a machine, means to print and issue tickets in a series, means to move the ticket strip forward and thereafter to hold the same stationary, means to perforate between consecutive tickets in a series while the ticket strip is being held stationary, said perforating means including two movable perforating plates, and means whereby said perforating plates will be moved into engagement with the part of the ticket strip between consecutive tickets.

23. In a machine, means to print and issue consecutive tickets of a series, means to feed the ticket strip forward and thereafter to hold it stationary, means to cause a perforation to be made in the ticket strip between consecutive tickets, said perforating means including two perforating plates, arms on which said plates are mounted, a lever, and means whereby the operation of said lever causes both of said arms to move said plates into engagement with the ticket strip.

24. In a machine, means to print and issue any number of tickets in a series, a perforating means to perforate between the tickets, a separate means whereby the series of tickets are severed from the unprinted ticket paper, a rotatable shaft to actuate said severing means, and means to prevent said shaft from actuating said severing means until the last of the series of tickets is printed.

25. In a machine, means to print and issue any number of tickets in a series, a rotatable shaft, a sleeve thereon, means whereby the rotation of said sleeve will cause the series of tickets to be severed from the unprinted ticket strip, and means whereby said sleeve will be locked to said shaft when the last ticket is being printed.

26. In a machine, means to print and issue any number of tickets in a series, a shaft, means whereby said shaft is rotated one complete revolution as the said machine is operated, a sleeve rotatably mounted on said shaft, lever means whereby said sleeve may be locked to said shaft so as to rotate therewith, means to prevent the operation of said lever means until the last ticket of the series is being printed, and means whereby the operation of said sleeve will cause the printed tickets to be severed from the remainder of the ticket strip.

27. In a machine, means to print and issue any number of tickets in a series, means whereby the number of tickets to be issued may be set up, an escapement forming a part of the said last mentioned means, a lever controlled by the position of said escapement, a rotatable shaft, means whereby said shaft is moved one rotation each time said machine is operated, a sleeve on said shaft, means controlled by said lever to lock or unlock said sleeve from said shaft, and means controlled by said sleeve to sever the printed tickets from the unprinted ticket strip.

28. In a machine, means to print and issue any number of tickets in a series, a rotatable disc to govern the number of tickets to be issued, a severing means, and means controlled by the position of said disc so that the severing means will be held inoperative until the last of the tickets set up have been printed.

ROBERT B. LONG.